United States Patent
Mehew et al.

(10) Patent No.: US 9,754,132 B2
(45) Date of Patent: Sep. 5, 2017

(54) MULTI-USER DEVICE WITH INFORMATION CAPTURE CAPABILITIES

(75) Inventors: Evans Mehew, Larkspur, CO (US); Scott Paintin, Littleton, CO (US); Dianna Lyons, Highlands Ranch, CO (US); Julene M. Robbins, Centennial, CO (US)

(73) Assignee: The Western Union Company, Englewood, CO (US)

( * ) Notice: Subject to any disclaimer, the term of this patent is extended or adjusted under 35 U.S.C. 154(b) by 25 days.

(21) Appl. No.: 12/821,655

(22) Filed: Jun. 23, 2010

(65) Prior Publication Data

US 2011/0320353 A1    Dec. 29, 2011

(51) Int. Cl.
| | |
|---|---|
| G06Q 40/00 | (2012.01) |
| G06F 21/79 | (2013.01) |
| G06Q 20/20 | (2012.01) |
| G06Q 20/40 | (2012.01) |
| G06F 21/32 | (2013.01) |

(52) U.S. Cl.
CPC .............. *G06F 21/79* (2013.01); *G06F 21/32* (2013.01); *G06Q 20/206* (2013.01); *G06Q 20/40145* (2013.01)

(58) Field of Classification Search
CPC ...................................................... G06K 9/00
USPC ....... 705/1.1, 44, 26, 35, 39, 40; 380/23, 24, 380/25; 902/3, 4; 382/116, 119, 123, 382/126, 138
See application file for complete search history.

(56) References Cited

U.S. PATENT DOCUMENTS

| | | | | |
|---|---|---|---|---|
| 5,280,527 A | * | 1/1994 | Gullman | G06K 19/0718 713/184 |
| 5,774,602 A | * | 6/1998 | Taguchi | G06K 9/24 382/188 |
| 6,154,879 A | * | 11/2000 | Pare, Jr. | G01F 19/005 705/26.3 |
| 6,307,956 B1 | * | 10/2001 | Black | G06F 3/03545 382/124 |
| 6,594,376 B2 | * | 7/2003 | Hoffman | G06K 9/6255 382/115 |
| 6,839,453 B1 | | 1/2005 | McWilliam et al. | |
| 7,279,646 B2 | | 10/2007 | Xu | |
| 7,343,299 B2 | | 3/2008 | Algazi | |
| 7,793,109 B2 | | 9/2010 | Ortiz | |

(Continued)

*Primary Examiner* — John H Holly
(74) *Attorney, Agent, or Firm* — Kilpatrick Townsend & Stockton LLP (57) ABSTRACT

Methods and systems, related to a biometrically secured user input device for conducting a transaction are described. The user input device may comprise a biometric authentication device. At the biometrically secured user input device, a biometric sample may be received from a user. The biometrically secured user input device may transmit the biometric sample, provided by the user, to a host computer system. The host computer system may compare the biometric sample provided by the user to another biometric sample. Handwriting data from the user may then be received by the user input device. The handwriting data may be transmitted to a computer system by the user input device. Transaction data based on the handwriting data may be transmitted from the computer system to a host computer system. The financial transaction may be conducted using the transaction data transmitted to the host computer system from the computer system.

19 Claims, 6 Drawing Sheets

(56) References Cited

U.S. PATENT DOCUMENTS

| | | |
|---|---|---|
| 8,079,079 B2 | 12/2011 | Zhang et al. |
| 8,228,299 B1 | 7/2012 | Maloney et al. |
| 8,884,876 B2 | 11/2014 | Song et al. |
| 2002/0001029 A1 | 1/2002 | Abe |
| 2002/0083323 A1 | 6/2002 | Cromer et al. |
| 2002/0091937 A1* | 7/2002 | Ortiz .................. H04L 63/0861 726/5 |
| 2002/0107885 A1 | 8/2002 | Brooks et al. |
| 2002/0170885 A1 | 11/2002 | Krenz |
| 2002/0178369 A1* | 11/2002 | Black .................. G06F 3/03545 713/186 |
| 2005/0134927 A1 | 6/2005 | Nomura et al. |
| 2005/0163377 A1 | 7/2005 | Walch |
| 2007/0139367 A1 | 6/2007 | Goffin |
| 2007/0235532 A1 | 10/2007 | Lapstun et al. |
| 2008/0115981 A1 | 5/2008 | Bechtel |
| 2008/0148395 A1 | 6/2008 | Brock |
| 2008/0253659 A1 | 10/2008 | Walch |
| 2009/0024707 A1 | 1/2009 | Aase et al. |
| 2009/0244644 A1 | 10/2009 | Matsuyama et al. |
| 2010/0283766 A1 | 11/2010 | Shieh |
| 2011/0179180 A1 | 7/2011 | Schleifer et al. |
| 2011/0231909 A1 | 9/2011 | Shibuya |
| 2011/0316665 A1 | 12/2011 | Mehew et al. |
| 2011/0320352 A1 | 12/2011 | Mehew et al. |
| 2011/0320353 A1 | 12/2011 | Mehew et al. |
| 2014/0028635 A1 | 1/2014 | Krah |
| 2014/0297528 A1 | 10/2014 | Agrawal et al. |

* cited by examiner

MULTI-USER DEVICE WITH INFORMATION CAPTURE CAPABILITIES

CROSS-REFERENCES TO RELATED APPLICATIONS

This application is related to co-pending application Ser. No. 12/821,625, entitled "Biometrically Secured User Input for Forms". This application is also related to co-pending application Ser. No. 12/821,681, entitled "Personal Writing Device with User Recognition Capabilities and Personal Information Storage". Each of these co-pending applications is hereby incorporated by reference for all purposes.

BACKGROUND OF THE INVENTION

In many public and private settings, multiple people use the same device to conduct transactions. For example, at home, multiple family members may use the same computer to purchase goods and/or services from an online retailer. In a public setting, scores of people may use the same terminal to conduct financial transactions, such as a money transfer transaction with a money transfer service provider, or deposits or withdrawals with an automated teller machine from a bank account.

While the vast majority of financial transactions are conducted honestly, inevitably, a small portion of people attempt to exploit weaknesses of transaction systems to commit fraud, launder money, or otherwise commit illegal or immoral activities. As an example of such a fraudulent transaction, a person may attempt to obscure his identity while sending or receiving a money transfer. This may be an attempt to make the transaction untraceable or to make it impossible to determine if the money originates from an illegal source. Obscuring the identity of a person participating in a financial transaction may also be an attempt to avoid being detected because the person's name appears on the United States Office of Foreign Assets Control's (OFAC) Specially Designated Nationals (SDN) list. Besides obscuring his or her identity during money transfers, a person may attempt to obscure his identity when attempting to conduct an online purchase using a stolen transaction card number (e.g., a card or number linked to a credit card account, debit card account, stored value account, or gift card). In another example, the person may attempt to (electronically) sign a contract under someone else's name in order to receive the benefit but avoid contractual requirements. For example, agreeing to be a member in a wine of the month club for a year may result in an initial free case of wine (which the perpetrator of the fraud would attempt to acquire), while the payment information provided by the fraudster would be linked to someone else (possibly real or imaginary).

This invention addresses these and other problems.

BRIEF SUMMARY OF THE INVENTION

A multi-user biometrically secured input device is described. The multi-user biometrically secured input device, alternatively referred to as a user input device, may require a user to submit a biometric identifier, such as a fingerprint, when conducting an electronic transaction, such as a financial transaction.

Such an arrangement may allow for a greater level of confidence in a transaction because a biometric identifier of the user is linked to the information provided by the user. If the user is a new user, the biometric identifier may be compared to other previously submitted biometric identifiers in an attempt to determine if the user is attempting to present himself under a false identity. Assuming the user is honestly representing that he is a new user, the user may then be requested to provide biographical information to store with his account. Alternatively, if the user has a previously established account, the user's provided biometric sample may be compared to a previously stored biometric sample to authenticate the user's identity. If the user's identity is authenticated, the user may be presented with some or all of his account information, such as biographical and/or financial account information, to save the user from having to reenter the information to conduct a transaction.

The user input device may be in the form of a pen. After the user's identity has been confirmed using the biometric sample, the user may write information necessary to conduct a transaction (such as an account number, an amount of money, a recipient's name and address, the recipient's name, the recipient's address, a signature, etc.) on a form. The user input device may electronically capture this handwriting information and transmit it to a computer system. This computer system may convert the handwriting information into electronic editable text, possibly using a process such as optical character recognition. The received handwriting information and the electronic editable text may be highly trusted by merchants, banks, governments, and money transfer service providers, because of the biometric authentication occurring at the user input device when the user is conducting the transaction.

In some embodiments, a method, using a biometrically secured user input device, for conducting a financial transaction initiated by a party that has not previously established an account with a financial entity conducting the financial transaction, is described. The method may include receiving, at the biometrically secured user input device, an indication that a user does not have a biometrically-secure user account with the financial institution. The method may include receiving, at the biometrically secured user input device, a biometric sample from a user, wherein the biometrically secured user input device comprises a biometric authentication device. The method may include transmitting, by the biometrically secured user input device, the biometric sample provided by the user, to a host computer system. The method may include comparing, by the host computer system, the biometric sample provided by the user to a plurality of other biometric samples provided by a plurality of users. The method may include determining, by the host computer system, the biometric sample provided by the user does not match a biometric sample of one of the plurality of users. The method may include creating, by the host computer system, the account for the user. The method may also include linking, by the host computer system, the biometric sample of the user to the account for the user. The method may include transmitting, to the user input device, an authorization to collect handwriting and/or other biometric data (e.g., voice sample, fingerprint, retina scan, pulse rate, body temperature, etc.) from the user. The method may include receiving, by the user input device, handwriting data from the user, wherein the handwriting and/or other biometric data comprises information to conduct the financial transaction. The method may include transmitting, by the user input device, to a computer system, the handwriting and/or other biometric data. The method may further include transmitting, by the computer system, to the host computer system, transaction data based on the handwriting and/or other biometric data. The method may include conducting the financial transaction using the transaction data transmitted to the host computer system from the computer system.

In some embodiments, the handwriting data comprises biographical information of the user. Also, in some embodiments, the method further comprises linking the biographical information to the user's account. In some embodiments, the financial transaction is a money transfer transaction. The financial institution may be a money transfer service provider. In some embodiments, the biometrically secured user input device communicates with the computer system located at an agent location of the money transfer service provider. Also, in some embodiments, the biometric sample comprises data linked to a fingerprint of the user.

In some embodiments, a method, using a biometrically secured user input device, for conducting a financial transaction conducted by a user having previously established an account with a financial entity conducting the financial transaction is described. The method may include receiving, at the biometrically secured user input device, an indication that the user has a biometrically secured user account with the financial institution, wherein the indication comprises an account identifier linked to the biometrically secured user account. The method may include receiving, at the biometrically secured user input device, a biometric sample from the user, wherein the biometrically secured user input device comprises a biometric authentication device. The method may include transmitting, from the user input device, the biometric sample provided by the user, to a host computer system. The method may include comparing, by the host computer system, the biometric sample provided by the user to a previously stored biometric sample provided by the user linked to the account linked to the account identifier received from the user. The method may include determining, by the host computer system, the biometric sample provided by the user and the previously stored biometric sample provided by the user match. The method may include transmitting, to the user input device, an authorization to collect handwriting and/or other biometric data from the user. The method may include receiving, by the user input device, handwriting and/or other biometric data from the user, wherein the handwriting and/or other biometric data comprises information to conduct the financial transaction. The method may include transmitting, by the user input device, to a computer system, the handwriting and/or other biometric data. The method may include transmitting, by the computer system, to the host computer system, transaction data based on the handwriting and/or other biometric data. The method may also include conducting the financial transaction using the transaction data transmitted to the host computer system from the computer system.

In some embodiments, a computer-readable storage medium having a computer-readable program embodied therein for directing operation of a computer system comprising a communication system, a processor, and a storage device, wherein the computer-readable program comprises instructions for operating the computer system to conduct a financial transaction involving a biometrically secured user input device and a host computer system is described. The instructions may comprise instructions for receiving an indication of whether a user has a biometrically secured user account with a financial institution. The instructions may comprise instructions for receiving, from the biometrically secured user input device, a biometric sample from a user, wherein the biometrically secured user input device comprises a biometric authentication device. The instructions may comprise instructions for transmitting the biometric sample, provided by the user, to a host computer system. The instructions may comprise instructions for receiving an indication from the host computer system to permit the user to provide information to conduct the financial transaction. The instructions may comprise instructions for receiving, from the user input device (e.g., handwriting and/or other biometric data based on the handwriting of the user, wherein the handwriting and/or other biometric data comprises information to conduct the financial transaction). The instructions may comprise instructions for transmitting to the host computer system, transaction data based on the handwriting and/or other biometric data. The instructions may comprise instructions for providing a confirmation to the user that the financial transaction has been at least initiated successfully.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components.

DETAILED DESCRIPTION OF THE INVENTION

A multi-user biometrically secured input device is described. The multi-user biometrically secured input device, alternatively referred to as a user input device, may allow a user to submit a biometric identifier, such as a fingerprint, handwriting sample, voice print, retinal scan, etc., when conducting a transaction, such as a financial transaction, to help authenticate the user's identity.

If the user identifies himself as a new user, he may be prompted to provide a biometric sample to the user input device. For example, this biometric sample may be a fingerprint, a voice print, a signature, a retina scan or any other appropriate biometric identifier that may be used to identify the user. The collected biometric sample may be transmitted to a local computer system and/or a remote host computer system. The biometric sample may be compared to other stored samples (e.g., at the host computer system). From this, it may be possible to determine if the user has previously registered for an account and is attempting to fraudulently (or accidentally) create another account. If the biometric sample does not match some other stored biometric sample, the user may be prompted to provide biographical and/or financial information, possibly using the user input device. For example, the user may provide a home address, his full name, account preferences, a bank account number, credit card number, etc. Following the establishment of his account, the user may use the user input device to provide additional information, possibly information that is specific to a transaction the user is attempting to conduct.

If the user input device is in the form of a pen, the user may handwrite the information necessary to conduct the transaction. Once the user has completed handwriting the necessary information, or while the user is handwriting the necessary information, the handwriting data, collected by the user input device, may be transmitted to a local computer system. At the computer system, some or all of the handwriting data may be converted into electronic editable text. To accomplish this, a process such as optical character recognition may be used. The converted text and/or some or all of the handwriting data may be transmitted to a host computer system, possibly remotely located, to conduct the transaction.

If the user specifies that he is not a new user, but rather already has an account, the biometric sample he provided may be compared to a biometric sample stored at the local computer system and/or the host computer system linked to the account identified by the user. If the biometric sample matches the stored biometric sample, the user may be permitted to conduct the transaction. Additionally, biographical, account information, and/or loyalty stored and linked to the user's account may be used to reduce the amount of information necessary to be supplied by the user to conduct a transaction. Such biographical, account, and/or loyalty information may be transmitted to the computer system local to the user and displayed for his verification. The user may be presented the opportunity to update any of the information that is no longer valid. Following the user updating and/or confirmation of the information presented to him, the transaction may execute.

Throughout this application, the transfer conducted by the user is typically referred to as being a money transfer transaction. However, those with skill in the art will recognize that such an arrangement using a user input device, a computer system, and a remote host computer system having access to a database of users' accounts with associated biometric samples may be used for many different types of transactions. By way of example only, another form of transaction that may be conducted with such an arrangement is a purchase transaction with an online or other merchant. Another example may be the transaction conducted with an automated teller machine (ATM). Further, such transactions may occur at a place of business, such as an agent location of a money transfer service provider (e.g., WESTERN UNION), or at a private location, such as a person's home.

Figure 1:
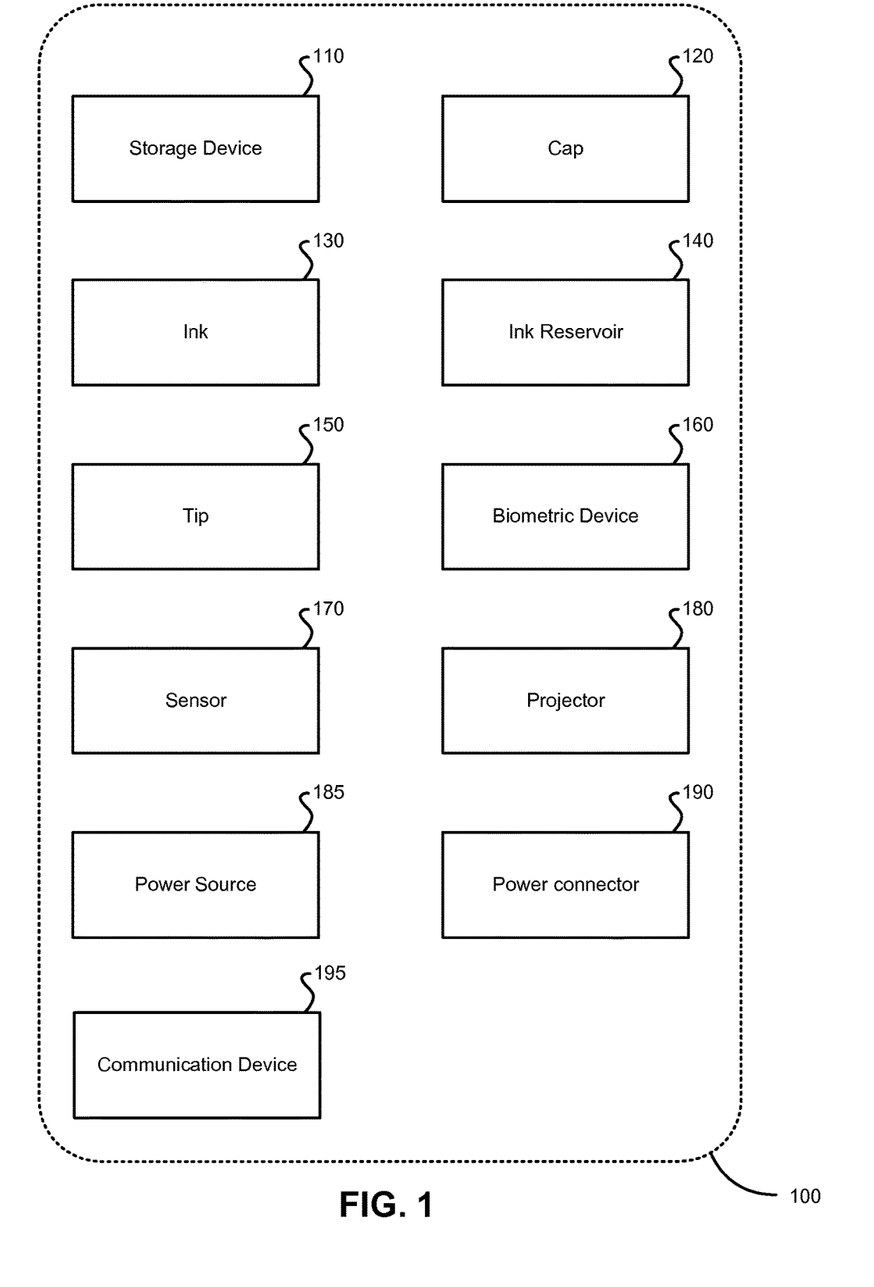
FIG. 1 illustrates a simplified block diagram of subsystems in an embodiment of a user input device.

A user input device capable of performing such tasks may have several subsystems. FIG. 1 illustrates a simplified block diagram of various subsystems which may be present in user-input device 100. The user input device may have: a storage device 110, a cap 120, ink 130, an ink reservoir 140, a tip 150, a biometric authentication device 160, a sensor 170, a projector 180, a power source 185, a power connector 190, and/or a communication device 195.

The user-input device may have a storage device 110. The storage device may be configured to temporarily store collected biometric samples for users. The storage device 110 may also store handwriting information gathered as the user writes. Some or all of the data stored on storage device 110 may be encrypted.

The user-input device 100 may have a cap 120. Cap 120 may be a removable cover that may be used to cover tip 150. User-input device 100 may also have ink 130 and ink reservoir 140. Ink 130 may be stored in reservoir 140. Ink reservoir 140 may be located within the user-input device 100. User-input device 100 may also have a tip 150. Tip 150 may be used to transfer ink 130 from the ink reservoir 140 to a writing medium, such as paper and/or a whiteboard. Tip 150 may be a ball-point. Tip 150 may be retractable into the body of the user-input device. Ink reservoir 140 may be refillable. In some embodiments, ink 130 and ink reservoir 140 are not present; however tip 150 is present. This configuration allows user-input device 100 to be moved across a surface, such as paper, a white board, a computer display, or any other surface without leaving a mark.

To be clear, ink 130 of user input device 100 may be used to write on any surface, including printed forms or plain paper. The term "printed forms" is intended to be interpreted broadly, referring to any form containing text/writing and one or more fields for completion by a user. If user input device 100 is used to capture handwriting data while the user "writes" on a screen displaying an electronic version of a form, tip 150 may be retracted within user input device 100 or otherwise unavailable. Alternatively, in such an instance, a user input device may not contain ink 130 and/or tip 150.

User-input device 100 also has a biometric authentication device 160. Biometric authentication device 160 may allow for biometric information to be collected from a user. Biometric authentication device 160 may be a fingerprint scanner, a voiceprint recorder, a handwriting analyzer, a retina scanner, and/or any other biometric device capable of identifying a user. If biometric authentication device 160 is a fingerprint scanner, the user may swipe one or more fingers over the fingerprint scanner to input his fingerprint. If biometric authentication device 160 is a voiceprint recorder, the user may be asked to speak his name or a series of words so that the user's voice may be recorded and analyzed. If biometric authentication device 160 is a handwriting analyzer, the user may be prompted to sign his name or write a number, world, symbol, and/or a sentence. The handwriting analyzer may then use the peculiarities of the user's handwriting to authenticate his identity. If biometric authentication device 160 is a retina scanner, the user may be prompted to hold the retina scanner to his eye, allowing the scanner to image the user's retina. Each of these various forms of biometric authentication device 160 may allow for a biometric sample to be collected from the user. Each of these collected biometric samples may be compared to one or more previously collected biometric samples and/or otherwise analyzed to determine if the user's identity is authentic.

The user-input device 100 may have a handwriting sensor 170. Handwriting sensor 170 may be a camera that captures images of ink transferred to a writing medium and/or captures images of tip 150 moving on a writing medium or other surface. Handwriting sensor 170 may measure the movement of user-input device 100 to determine what the user is writing. Handwriting sensor 170 may measure handwriting pressure on the user input device 100 and/or a surface. Handwriting data captured by the handwriting sensor 170 may be stored at storage device 110 and/or may be transferred to another device, such as a computer system or host computer system.

If a camera is used for the sensor, it may be possible to use the camera for other purposes. For example, the camera may be used to image the user (e.g., to compare to a previously taken picture of the user for authentication), or to image goods or services (e.g., via a barcode) that the user wishes to purchase. Such a camera might be used to image barcodes or other product codes displayed on a billboard, magazine, catalog, mailing, etc. The user may also be able to image a barcode or other code on a bill.

User-input device 100 may also have a projector 180. Projector 180 may be attached to the body of the user-input device 100 or may be attached to cap 120. Projector 180 may allow for an image to be projected on to a surface (or in holographic form). The image projected by projector 180 may be an image of a form. Therefore, projector 180 may project an image of a form onto a surface with user-input device 100 being able to maneuver over the image projected onto the surface, giving the user the impression of "writing" on the "form." Projector 180 may be attached to or in communication with a computer system or a host computer system.

An on-board power source 185 and power connector 190 may also be present on user-input device 100. On-board power source 180 may be one or more batteries. The batteries may be rechargeable. Power connector 190 may serve to allow user-input device 100 to be connected to another power source for recharging of on-board power source 185. In some embodiments, user-input device 100 is always connected to some other power source via power connector 190.

User-input device 100 may also have a communication device 195. Communication device 195 may allow user-input device 100 to communicate with other devices, such as a computer system. Communication device 195 may allow for either wired or wireless communication with other devices, such as via BLUETOOTH, Wi-Fi, or USB protocols. Communication device 195 may allow for biometric data of the user to be transmitted to another device. After the user's identity has been authenticated, communication device 195 may allow for data stored on storage device 110, such as financial account and/or loyalty numbers, to be transmitted to another device. Financial account and/or loyalty numbers may be stored on and retrieved from a computer system and/or host computer system.

Figure 2:
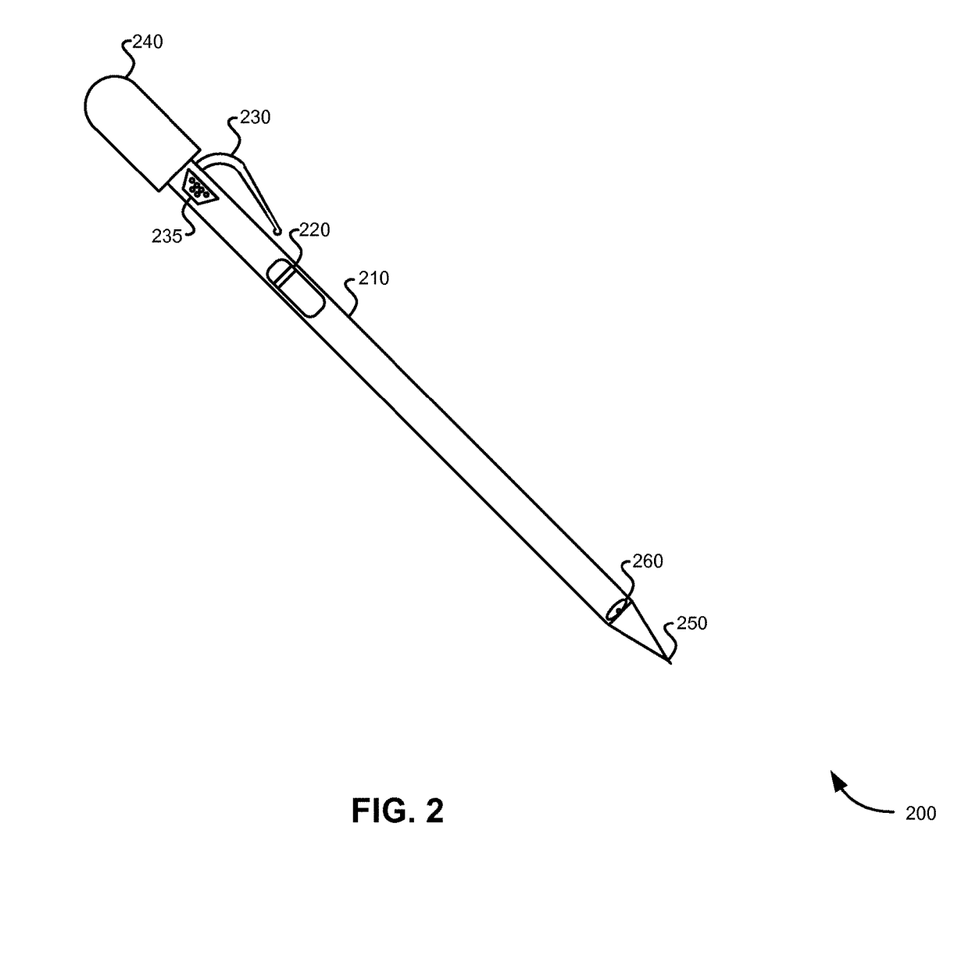
FIG. 2 illustrates a simplified embodiment of a user input device.

The user-input device 100 may be in the form of a writing instrument. FIG. 2 illustrates a simplified embodiment of such a user-input device 200. User-input device 200 may represent user-input device 100 of FIG. 1, or may represent some other user-input device. A user-input device 200 in the form of a writing implement may consist of a case 210, a biometric authentication device 220, a clip 230, an external communication connector 235, a cap 240, a tip 250, and a sensor 260. Not illustrated, a power supply may be housed within the pen. Also, an ink reservoir, not pictured, may be housed within in the case of the user-input device to store ink (also not pictured) to be used for writing. The user input device may have a case 210. The case may be plastic, metal, wood, carbon fiber, or any other suitable material for serving as the structure for a user-input device in the form of a writing instrument.

A biometric authentication device 220 may be attached to case 210. Biometric authentication device 220 may be present anywhere on the user-input device 200. Biometric authentication device 220 may be biometric authentication device 160 of FIG. 1, or may represent some other biometric authentication device.

A clip 230 may be present. A clip 230 may allow the user to attach the user input device 200 to any number of items, such as a pad of paper or shirt pocket, for safe keeping.

Connector 235 may serve as both a power connector and a data transfer connector. For example, connector 235 may serve as the power connector and the communication device, such as the power connector and the communication device of FIG. 1. In some embodiments, the power connector and the communication device are separate, such as in embodiments where the communication device communicates with other devices, such as a computer system, wirelessly.

Cap 240 may represent cap 120 of FIG. 1, or may represent some other cap. Cap 240 may house a projector, such as projector 180 of FIG. 1. Cap 240 may be detachable from the non-writing end of the user input device 200, and detachable to the writing end to cover tip 250 and/or sensor 260.

Also attached to case 110 of user input device 200 may be handwriting sensor 260. Handwriting sensor 260 may be the same handwriting sensor as sensor 170 of FIG. 1, or may represent some other handwriting sensor.

Ink and an ink reservoir, such as ink 130 and ink reservoir at 140 of FIG. 1, may be within case 210. Tip 250 may allow a user to write using user input device 200 and transfer ink to a writing medium, such as paper, via tip 250.

Figure 3:
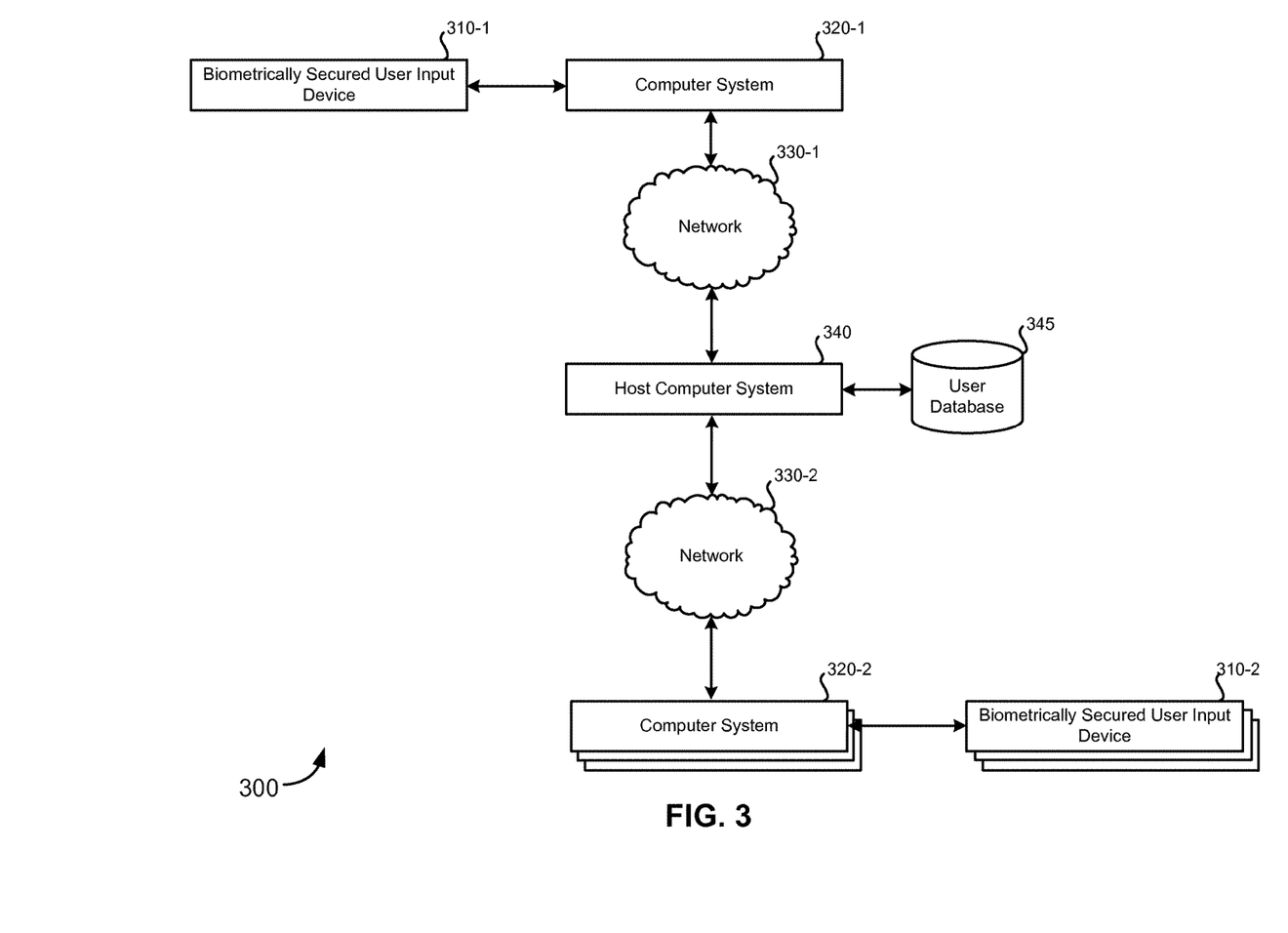
FIG. 3 illustrates a simplified embodiment of a system utilizing a user input device.

User input device 200 may be used in a system such as system 300 of FIG. 3. In FIG. 3, system 300 includes biometrically secured user input device 310-1, computer system 320-1, network(s) 330, host computer system 340, other computer systems 320-2 and biometrically secured user input device 310-2. In the embodiment of system 300 illustrated in FIG. 3, the biometrically secured user input device 310-1 is in communication with computer system 320-1. User input device 310-1 and computer system 320-1 are located at or near the same physical location. The user input device 310-1 may communicate with computer system 320 via some form of near field communication, such as BLUETOOTH. Alternatively, the wire may serve to connect user input device 310-1 to computer system 320-1 User input device 310-1 may transmit data, such as handwriting data and/or biometric samples collected from a user to computer system 320-1. The computer system 320-1 may alert user input device 310-1 to request a biometric sample from the user, accept handwriting input, and/or to perform other tasks. Computer system 320-1, along with biometrically secured user input device 310-1, may be located at a place of business, such as an agent location of a money service provider. Alternatively computer system 320-1 and user input device 310-1 may be co-located at a private residence.

Computer system 320-1 may communicate with a host computer system 340 via a network 330-1. Network 330-1 may be a public network such as the Internet, or a private network such as a company's private intranet. Network 330-1 may also represent a hybrid network using both a private and public network.

The host computer system 340 may represent a server, such as a server of a money transfer service provider. The host computer system contacted by computer system 320-1 may vary depending on the entity the user is attempting to conduct a transaction with. For example a different host computer system may be contacted if the user wishes to conduct an online purchase transaction from an online retailer as opposed to an online money transfer completed by a money transfer service provider. In some embodiments, computer system 320-1 only interacts with a particular host computer system 340. Such an arrangement may be present where computer system 320-1 is located at an entity's place of business, such as an agent location of the money transfer service provider. There, computer system 320-1 may communicate only with the host computer system of the money transfer service provider.

Host computer system 340 may communicate with a user database 345. User database 345 may be located locally to host computer system 340. Alternatively, user database 345 may be located remote from host computer 340 and may be accessed by host computer system 340 via a network. User database 345 may contain accounts for various users. Within the database, biometric samples may be linked to some or all of the users and their associated accounts. Some or all of the accounts may also include biographical, financial account, and/or loyalty information.

Host computer system may communicate with various other computer systems 320-2 also. These computer systems 320-2 may be similar to computer system 320-1. Each of these computer systems may also be used with user input devices 310-2 similar to user input device 310-1. Therefore, a user who conducts a transaction from user input device 310-1 may have access to the same host computer system as if he conducted the transaction from a different physical location, such as one of computer systems 320-2. Network 330-2 may be the same network as network 330-1. Alternatively, network 330-2 may be a different network than network 330-1.

Figure 4:
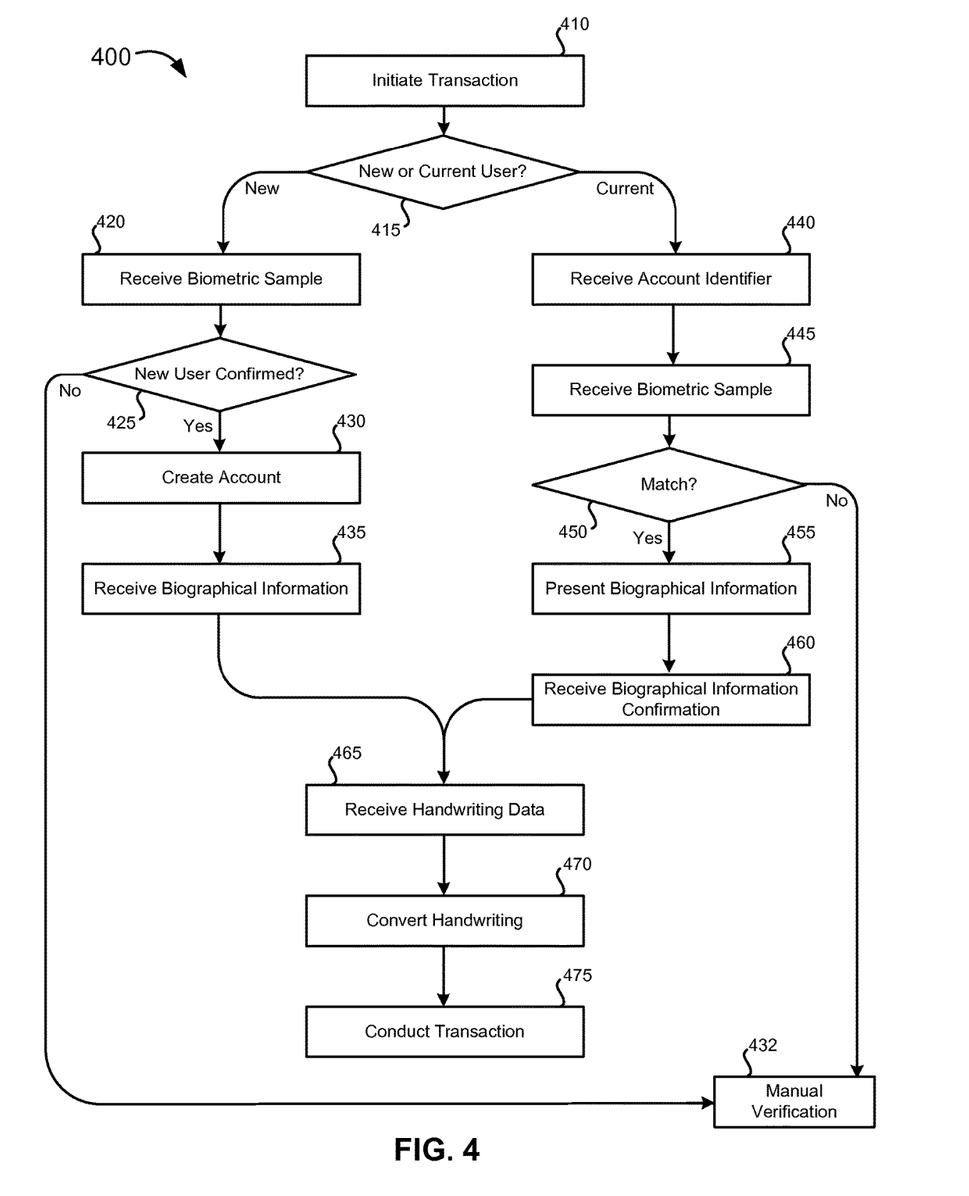
FIG. 4 illustrates a simplified method for using a user input device to authenticate a user's identity and conduct a transaction.

The system of FIG. 3 may be used to conduct a method, such as method 400 of FIG. 4. Besides system 300 of FIG. 3, method 400 may be conducted using other systems and devices. At block 410, a user may initiate a transaction. The user may initiate the transaction by providing input to a computer system, such as computer system 320 of FIG. 3, or some other computer system. A user may also initiate a transaction by providing input to a user input device, such as user input device 310 of FIG. 3. At block 415, the user may be queried if he is a new user or already has an account. Such a question may be displayed or asked by the computer system or the user input device The user may respond by providing input through the user input device (which would then be relayed to the computer system) or directly to the computer system.

If the user indicates that he is a new user, the user input device may be used to collect a biometric sample from the user. At block 420, the system and/or the user input device may request the user to provide a biometric sample The biometric sample provided by the user may match whatever biometric authentication device is present on the user input device. The biometric sample may be, as previously discussed, a fingerprint, a handwriting sample, such as a signature, a voice print or a retina scan, to make only a few examples. Once the user has provided this biometric sample, the biometric sample may be transmitted from the user input device to the computer system. The biometric sample may then be analyzed at the computer system or may be transmitted to the host computer system for analysis. Wherever the comparison occurs, the biometric sample provided by the user may be compared to one or more stored biometric samples previously provided. This may allow for a determination of whether the user previously created an account (possibly using another name) at an earlier time. At block 425, at least partially based on the biometric sample, it may be determined whether the user has previously created another account or not. If it is determined that the user is not a new user, the process may be halted. At such time, the transaction may be prevented from occurring. Also, the user may be directed to contact customer service at block 430. If the user is attempting to conduct the transaction at an agent location of the transaction provider, an agent may assist the user. This may involve the agent manually confirming the user's identity, such as by reviewing identification card of the user. If the identification card of the user suggests the user is misrepresenting himself, the agent may question him, contact law enforcement authorities and/or alert the transaction service provider.

If it is determined the user is a new user (e.g., the user's biometric sample does not match any other stored biometric sample), at block 425, the user is confirmed as a new user and the process may continue. At block 430, an account may be created for the user. The user submitted biometric sample may be linked to this account. The account and the biometric sample may be stored in a database, such as user database 345 in FIG. 3. Other databases may also be possible. At block 435, biographical information may be received from the user. This biographical information may be confirmed by an agent of the transaction provider. For example, if the transaction is a money transfer transaction, an agent of the money transfer provider may confirm that the biographical information provided by the user is correct. This may involve checking an identification card of the user. The agent of the money transfer service provider may provide the computer system and/or the host computer system with some indication that the user's biographical information is correct or incorrect.

Returning to block 415, if, instead of the user indicating that he is a new user, the user indicates that he is already a user, the method may proceed to block 440. At block 440, the user may provide some account identifier. This account identifier may be an account number, a username, the user's name, the user's credit card number, loyalty number, or any other identifier that may be used to identify the user and/or the account tied to the user. In some embodiments, a biometric sample serves as the account identifier. The user may provide the account identifier using the user input device and/or the computer system. If the user is using the user input device to input the account identifier, the user may write the user's account identifier on some visual medium, such as a printed form or a display screen. The printed form may serve as a receipt for the user.

At block 445, the user may provide a biometric sample using the user input device. This step may proceed similarly to block 420.

The biometric sample collected by the user input device may be transmitted to the computer system. The biometric sample may be analyzed by the computer system and/or it may be transmitted for analysis to the host computer system. At block 450, it may be determined whether the biometric sample provided by the user matches a stored biometric sample linked to the account identified by the user. If it does not, access to the account by the user may be blocked. This may indicate that the user is attempting to fraudulently access someone else's account. Alternatively, the user may in fact be attempting to access his own account; however, for whatever reason, the biometric sample he provided to the user input device does not match the stored biometric sample. The process may proceed to block 430, and the user may be contacted by a customer service representative and/or interact with the store clerk. The customer service representative or store clerk may be an agent or employee of the transaction provider. Again here, the customer service representative and/or store clerk may verify an identification card of the user, and if appropriate contact law enforcement and/or the transaction service provider.

If the biometric sample does match the stored biometric sample, the method may proceed to block 455. At block 455, biographical, financial, and/or loyalty information links to the account may be transmitted from the host computer system to the computer system, and displayed, or otherwise presented, to the user. This information may include account numbers, addresses, previous transactions, etc. At block 460, the user may confirm or make changes to the information. Presenting the user with biographical information (and allowing him to make any changes necessary) may decrease the amount of information necessary to be supplied by the user to conduct the transaction. For example, if the transaction requires the user's home address, this information may not need to be written (or otherwise provided) by the user using the user input device because the information was already stored in the user's account.

At block 465, regardless of whether the user identified himself as a new user or a user already having an account, handwriting data may be received by the user input device from the user. The handwriting data received by the user input device may represent some or all of the information necessary to conduct the transaction. The user may handwrite the responses on a printed form. For example, if the transaction is a money transfer transaction, a printed form that lists all of the required information to conduct the money transfer may be completed by the user. The printed form, after it has been completed by the user, may be kept by the user as a receipt for the transaction. The handwriting data captured by the user input device may then be transmitted to the computer system. The handwriting data may also be transmitted to the host computer system. At block 470, be it by the computer system or the host computer system, some or all the handwriting provided by the user may be converted into electronic editable text. The handwriting may be converted using a process such as optical character recognition. Some of the user's handwriting may not be converted to electronic edible text; for example, the signature supplied by the user may be maintained in the user's handwriting as proof of the user entering the transaction. Following the user's handwriting being converted to electronic editable text, the electronic editable text may be presented to the user via computer system to confirm that the handwriting data has been properly converted to electronic edible text. Following user's handwriting being converted to electronic editable text, at block 475, the transaction may be conducted based on the handwriting supplied by the user.

Figure 5:
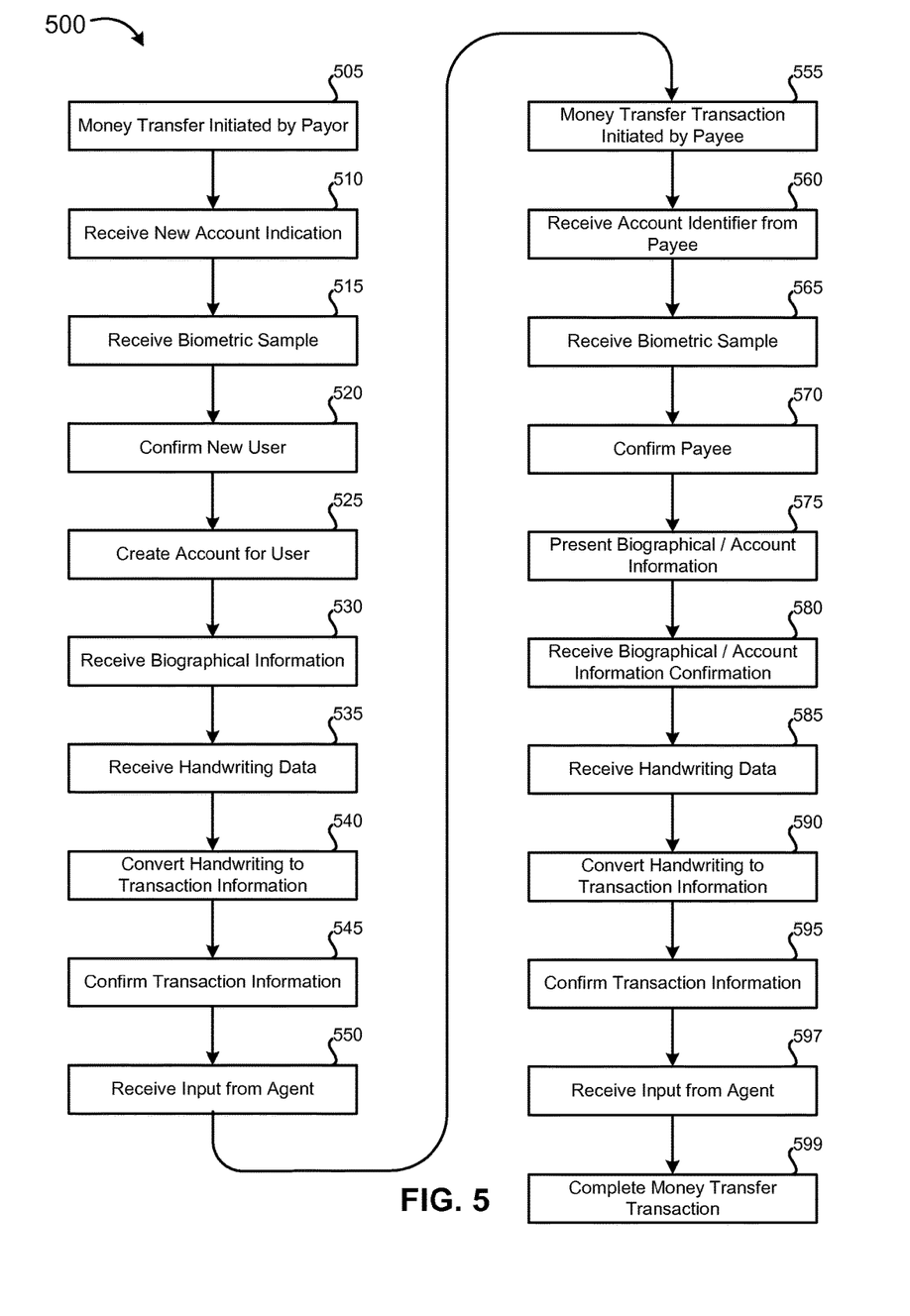
FIG. 5 illustrates a simplified embodiment of a method for conducting a money transfer transaction.

While the previous transaction may represent any type of transaction, one possible type of transaction it may represent is a money transfer transaction. FIG. 5 illustrates a simplified embodiment of a method 500 for conducting a money transfer transaction. At block 505, a person (a payor), transferring money to someone else or to some other entity (a payee), initiates a money transfer transaction with a money transfer service provider. This may involve the payor traveling to an agent location of the money transfer service provider or contacting the money transfer service provider from a remote terminal, such as a kiosk, ATM, telephone, or home computer. However the payor contacts the money transfer service provider, he may indicate that he wishes to conduct a money transfer transaction and may indicate whether the transfer constitutes an international or domestic transaction. For the purpose of this example, it is assumed that the payor does not already have a user account. However, in some embodiments, the payor already has a user account. At block 510, the payor may indicate to the money transfer provider, possibly using a user input device (such as those previously described) or a computer system (again, such as those previously described), which may be in the form of a terminal, kiosk, or home computer, that he does not have an account with the money transfer service provider and requires a new account to proceed.

Following receiving an indication that the payor does not have an account, the payor may be informed to provide a biometric sample to the user input device. The user input device may receive a biometric sample from the payor at block 515. As previously discussed, this biometric sample may be a signature, a fingerprint, a voiceprint, a retina scan, or any other possible biometric sample that the user input device may be used to gather. The biometric sample collected by the user input device may then be transmitted to the computer system at block 520. The computer system, in turn, may transmit the biometric sample to the host computer system of the money transfer service provider. The biometric sample provided by the payor may be compared to stored biometric samples provided by other users to determine if the payor already has an account, possibly under a different name. Assuming that no match is found, the process may continue. The payor may receive a confirmation from the computer system that he qualifies for a new account. At block 525, a new account for the payor may be created.

The payor may be requested to provide various biographical, financial, and/or loyalty account information to be stored as part of his account at block 530. The user may input this information using the user input device. In some embodiments, the payor is presented with a printed paper form. The payor may fill out the form, with the biographical, financial and/or loyalty account handwriting information collected by the user input device and transmitted to the computer system and/or the host computer system. If the payor is providing such information at an agent location of the money transfer service provider, an agent of the money transfer service provider may inspect and confirm the payor's biographical information by reviewing an identification card of the user.

The payor may then provide other handwritten data at block 535. This handwritten data may be specific to the money transfer transaction the payor is conducting. This information may be handwritten on the same printed form used to provide the biographical, financial, and/or loyalty account information or may be handwritten by the payor on some other printed form. For example, the payor may need to handwrite an amount to transfer to the payee, the payee's name, and address. The payor may also need to sign the money transfer form, acknowledging various provisions of an agreement accompanying the money transfer transaction. As with the biographical and/or financial account information, the handwriting data collected by the user input device may be transmitted to the computer system and/or the host computer system. As an alternative to the user writing on a printed paper form, the user input device may be configured to be moved over a visual medium such as a display screen, such as a liquid crystal display, or a hologram. This may allow the user input device to electronically capture the payor's handwriting while not leaving physical markings on the visual medium.

Some or all of the handwriting data captured by the user input device may be transmitted to the computer system and/or the host computer system. To initiate the transaction, the handwriting data may need to be converted to electronic editable text at block 540. OCR may be performed by either the computer system, the host computer system, visual medium, and/or user input device on some or all of the handwriting data captured by the user input device. After the transaction information has been converted at least in part to electronic editable text, the payor may confirm that his handwriting has been properly converted. The handwritten data supplied by the payor may be displayed to the payor by the computer system (or by the visual medium, if the visual medium is so capable, such as if it is an LCD or some other active display). This display of the converted handwriting data may allow the payor to confirm the transaction information at block 545. If the OCR process converted a portion of the payor's handwriting incorrectly (or the payor wrote down incorrect transaction information), the user may be presented with an opportunity to confirm and/or modify the transaction information. This information may be modified and/or confirmed using the user input device or by directly interacting with the computer system. At this point, a money transfer control number may be provided to the payor. The money transfer control number may be supplied by the payee, along with possibly more information, identification, and/or biometric sample(s), in order to receive funds.

At block 550, if the money transfer transaction is being conducted at an agent location of the money transfer transaction, an agent may review the transaction before allowing the transaction to be initiated. If the payor wishes to use cash to fund the transaction, the agent may provide the computer system with an indication that the payor has (or has not) provided the correct amount of funds to allow the transaction to proceed. The payor may also fund the transaction using other methods, such as from a credit card account, debit card account, savings account, stored value account, mobile wallet, etc. If the payor is conducting the money transfer transaction from a personal computer, possibly located at his home, agent input may be unnecessary or may be in the form of a customer service representative reviewing the submitted transaction information of the payor.

At block 555, the payee of the money transfer transaction may initiate a second portion of the transaction in order to receive the funds that the payor has designated to be transmitted to him. This may occur after the payee has received some form of notification from the payor or the money transfer service provider that the funds are available to be received. Again, here, the payee may initiate the second portion of the transaction in person at an agent location of the money transfer service provider (which may be the same or a different agent location than the payor initiated the transaction at), at a personal computer, possibly at the payee's home, at a kiosk (such as an ATM), or through a mobile device (e.g., into a mobile wallet).

In this example, it is assumed that the payee already has an account with the money transfer service provider. However, this is for example purposes only. In some embodiments, the payee may have to create new account. At block 560, the payee may provide an account identifier using either a user input device or a computer system. This account identifier may be the payee's name, a money transfer control number, account number, or user name to name only a few possibilities. The payee may also be required to provide an account password. At block 565, the payee may be prompted to provide one or more biometric samples using the user input device. In response, the payee may provide the biometric sample(s) that would then be received by the user input device. The biometric sample(s), after being received by the user input device, may be transmitted to the computer system, and/or transmitted via the computer system to the host computer system. At block 570, the payee's biometric sample(s) may be compared to a stored biometric sample linked to the account identified by the payee or the account information may be retrieved using the biometric sample(s). If the biometric samples match, the second portion of the money transfer transaction may be permitted to continue. If not, the money transfer transaction may be halted, the money transfer service provider may be notified, and/or the payor may be notified that a possible attempt to fraudulently receive the money transfer has occurred. Assuming that the biometric sample(s) provided by the payee match the stored biometric sample(s) linked to the account, the payee's identity would be considered authenticated and the money transfer transaction would be permitted to continue.

At block 575, the payee may be presented with various biographical, financial, and/or loyalty account information. The information may be presented for the payee to confirm that it is correct. The payee may modify the information, if necessary. For example, the information may include an account number indicating where the funds linked to the money transfer initiated by the payor will be deposited. The payee may also have the ability to choose between multiple different accounts for the funds to be deposited. The payee may have the opportunity to select that he wishes to receive the funds in cash or to a stored value card or mobile wallet. The cash option may only be available if the money transfer transaction is being conducted by the payee at an agent location of the money transfer service provider. At block 580, using the user input device and/or the computer system, the payee may provide an indication as to what information needs to be modified, or that the information displayed is correct.

The payee may also be required to provide additional handwriting data (e.g., stroke, speed, pressure, etc.) via the user input device at block 585. This may be a signature acknowledging that the funds have been received. The handwriting data may be received using a user input device. As with the payor, the payee may provide handwriting using the user input device. Additional information may also be requested of the payee. For example, the payee may be required to provide a money transfer control number identifying the money transfer transaction initiated by the payor. At block 590, some or all of the handwriting supplied by the payee using the user input device may be converted using a process such as OCR to electronic editable text. The payee's handwriting, such as a signature, may be maintained as handwriting data and not converted to electronic editable text. Handwriting data that is converted to electronic editable text by either the computer system or the host computer system at block 590 may be presented to the payee to confirm that the information has been converted correctly at block 595.

At block 597, an agent of the money transfer service provider may provide input to the computer system, which may in turn be transmitted to the host computer system. This input, if the payee is receiving funds from the payor in cash or other value, may indicate the agent of the money transfer service provider has provided the cash or other value to the payee. Alternatively, the cash may be paid out by the computer system (such as by a device similar to an automated teller machine). In some embodiments, the agent may also manually confirm the payee's identity at this step, such as by checking an identification card of the payee. Finally, at block 599 the money transfer transaction may conclude.

Figure 6:
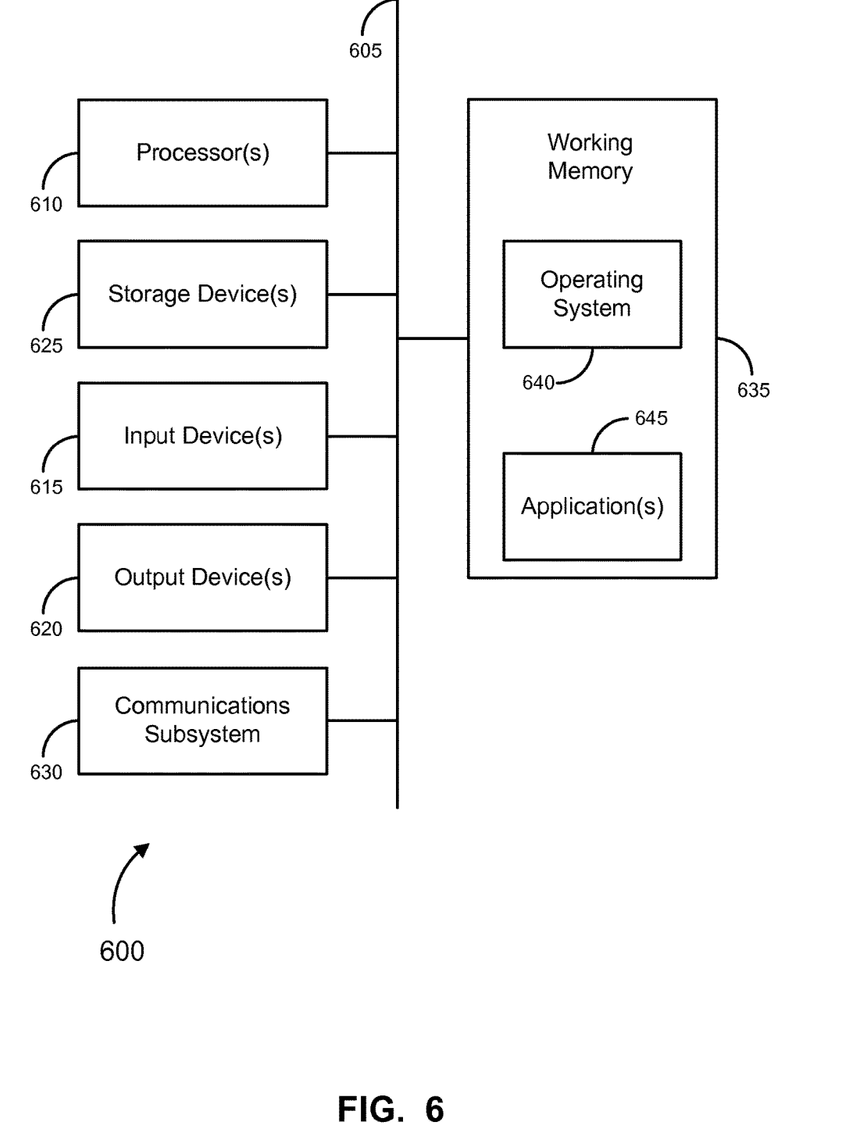
FIG. 6 illustrates a simplified block diagram of a computer system.

To perform the actions of the host computer system, the computer system, or any of the other previously mentioned computing devices, the computer system of FIG. 6 may be used. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, and/or a computer system. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method, using a biometrically secured writing implement, for conducting a transaction initiated by a user that has not previously established a biometrically secured user account with an entity conducting the transaction, the method comprising:
    receiving, at the biometrically secured writing implement, an indication that a user does not have a biometrically secured user account;
    receiving, at the biometrically secured writing implement, a first biometric sample from the user, wherein the biometrically secured writing implement comprises a biometric authentication device;
    transmitting, by the biometrically secured writing implement, the first biometric sample provided by the user, to a host computer system;
    comparing, by the host computer system, the first biometric sample provided by the user to a plurality of biometric samples provided by a plurality of all users of the host computer system;
    determining, by the host computer system, the first biometric sample provided by the user does not match any of the plurality of biometric samples provided by the plurality of all users of the host computer system;
    creating, by the host computer system, the account for the user based at least in part on a determination that the first biometric sample does not match any of the plurality of biometric samples provided by the plurality of all users of the host computer system;
    linking, by the host computer system, the biometric sample of the user to the account for the user;
    receiving, at the biometrically secured writing implement, a second biometric sample from the user;
    transmitting an authorization to the biometrically secured writing implement if the second biometric sample provided by the user and the previously received first biometric sample provided by the user match;
    preventing the biometrically secured writing implement from receiving handwriting data until the authorization is received;
    allowing the biometrically secured writing implement to receive handwriting data when the authorization is received;
    receiving, by the biometrically secured writing implement, handwriting data from the user, wherein the handwriting data comprises information to conduct the transaction including information necessary to identify a recipient of the transaction;
    transmitting, by the biometrically secured writing implement, the handwriting data;
    receiving, at a secondary computer system, the handwriting data;
    determining, at the secondary computer system, an identity of the recipient of the transaction from the handwriting data;
    transmitting, by the secondary computer system, to the host computer system, the identity of the recipient; and
    conducting, with the host computer system, the transaction using information from the handwriting data to conduct the transaction including at least the identity of the recipient.

2. The method of claim 1, wherein the handwriting data further comprises biographical information of the user.

3. The method of claim 2, further comprising linking, by the host computer system, the biographical information to the user's account.

4. The method of claim 1, wherein the transaction is a money transfer transaction.

5. The method of claim 4, wherein the host computer system is associated with a money transfer service provider.

6. The method of claim 5, wherein the biometrically secured writing implement communicates with the secondary computer system located at an agent location of the money transfer service provider.

7. The method of claim 1, wherein the first biometric sample comprises data linked to a fingerprint of the user.

8. The method of claim 1, wherein the information from the handwriting data to conduct the transaction further includes:
an account number;
an amount of money;
the recipient's name;
the recipient's address; and
a signature.

9. The method of claim 1, wherein the information from the handwriting data to conduct the transaction further includes:
an account number; and
an amount of money.

10. The method of claim 1, wherein the information from the handwriting data to conduct the transaction further includes:
an amount of money.

11. The method of claim 1, wherein receiving the biometric sample from the user comprises receiving an image from a camera, and receiving handwriting data from the user comprises receiving from the same camera.

12. A method, using a biometrically secured writing implement, for conducting a transaction conducted by a user having previously established an account with an entity conducting the transaction, the method comprising:
receiving, at a biometrically secured writing implement, an indication that a user does not have a biometrically secured user account;
receiving, at the biometrically secured writing implement, a first biometric sample from the user, wherein the biometrically secured writing implement comprises a biometric authentication device;
transmitting, by the biometrically secured writing implement, the first biometric sample provided by the user, to a host computer system;
comparing, by the host computer system, the first biometric sample provided by the user to a plurality of biometric samples provided by a plurality of all users of the host computer system;
determining, by the host computer system, the first biometric sample provided by the user does not match any of the plurality of biometric samples provided by the plurality of all users of the host computer system;
creating, by the host computer system, the account for the user based at least in part on a determination that the first biometric sample does not match any of the plurality of biometric samples provided by the plurality of all users of the host computer system;
receiving, at the biometrically secured writing implement, an indication that the user has the biometrically secured user account, wherein the indication comprises an account identifier linked to the biometrically secured user account;
receiving, at the biometrically secured writing implement, a second biometric sample from the user, wherein the biometrically secured writing implement comprises a biometric authentication device;
transmitting, from the biometrically secured writing implement, the second biometric sample provided by the user, to a host computer system;
comparing, by the host computer system, the second biometric sample provided by the user to the previously received first biometric sample provided by the user linked to the account linked to the account identifier received from the user;
determining, by the host computer system, the second biometric sample provided by the user and the previously received first biometric sample provided by the user match;
transmitting an authorization to the biometrically secured writing implement if the second biometric sample provided by the user and the previously received first biometric sample provided by the user match;
blocking access to the biometrically secured user account if the second biometric sample provided by the user and the previously received first biometric sample provided by the user do not match;
preventing the biometrically secured writing implement from receiving handwriting data until the authorization is received;
allowing the biometrically secured writing implement to receive handwriting data when the authorization is received;
receiving, by the biometrically secured writing implement, handwriting data from the user, wherein the handwriting data comprises information to conduct the transaction including information necessary to identify a recipient of the transaction;
transmitting, by the biometrically secured writing implement, the handwriting data;
receiving, at a secondary computer system, the handwriting data;
determining, at the secondary computer system, an identity of the recipient of the transaction from the handwriting data;
transmitting, by the secondary computer system, to the host computer system, the identity of the recipient; and
conducting, with the host computer system, the transaction using information from the handwriting data to conduct the transaction including at least the identity of the recipient.

13. The method of claim 12, further comprising transmitting, from the host computer to the secondary computer system, biographical information of the user, wherein the biographical information is transmitted to the secondary computer system after the biometric sample provided by the user has been determined to match the previously stored biometric sample of the user.

14. The method of claim 13, further comprising, presenting, by the secondary computer system, the biographical information to the user, wherein the biographical information reduces the amount of information supplied by the user necessary to conduct the transaction.

15. The method of claim 12, wherein the transaction is a money transfer transaction.

16. The method of claim 15, further comprising, receiving, by the host computer system, an indication that the user has presented an amount of cash to an agent of the money transfer service provider to fund the money transfer transaction.

17. The method of claim 12, further comprising, converting, by the secondary computer system, at least a portion of the handwriting data to transaction data.

18. A computer-readable non-transitory storage medium having a computer-readable program embodied therein for directing operation of a computer system comprising a communication system, a processor, and a storage device, wherein the computer-readable program comprises instructions for operating the computer system to conduct a transaction involving a biometrically secured user input device and a host computer system, the instructions further comprising instructions for:
- receiving an indication that a user does not have a biometrically secured user account;
- receiving, from a biometrically secured writing implement, a first biometric sample from the user, wherein the biometrically secured writing implement comprises a biometric authentication device;
- receiving, from the biometrically secured writing implement, the first biometric sample provided by the user;
- comparing the first biometric sample provided by the user to a plurality of biometric samples provided by a plurality of all users of a host computer system;
- determining the first biometric sample provided by the user does not match any of the plurality of biometric samples provided by the plurality of all users of the host computer system;
- creating the account for the user based at least in part on a determination that the first biometric sample does not match any of the plurality of biometric samples provided by the plurality of all users of the host computer system;
- receiving an indication that the user has a biometrically secured user account, wherein the indication comprises an account identifier linked to the biometrically secured user account;
- receiving, from the biometrically secured user input device, a second biometric sample from the user, wherein the biometrically secured user input device comprises a biometric authentication device;
- transmitting the second biometric sample provided by the user, to a host computer system;
- transmitting an authorization to the biometrically secured user input device if the second biometric sample provided by the user and the previously received first biometric sample provided by the user match;
- blocking access to the biometrically secured user account if the second biometric sample provided by the user and the previously received first biometric sample provided by the user do not match;
- preventing the biometrically secured input device from receiving handwriting data until the authorization is received;
- allowing the biometrically secured writing implement to receive handwriting data when the authorization is received;
- receiving, from the user input device, handwriting data based on the handwriting of the user, wherein the handwriting data comprises information to conduct the transaction including at least information necessary to identify a recipient of the transaction;
- determining an identity of the recipient of the transaction from the transaction information;
- conducting the transaction using information from the handwriting data to conduct the transaction including at least the identity of the recipient; and
- providing a confirmation to the user that the transaction has been at least initiated successfully.

19. The computer readable non-transitory medium of claim 18, wherein the instructions further comprise instructions for receiving biographical information from the host computer system for confirmation by the user, wherein the biographical information reduces an amount of information necessary to be supplied by the user to the user input device to conduct the transaction.

* * * * *